US007514018B2

(12) United States Patent
Schilling et al.

(10) Patent No.: US 7,514,018 B2
(45) Date of Patent: Apr. 7, 2009

(54) DUST SUPPRESSANT AND SOIL STABILIZATION COMPOSITION

(75) Inventors: Kevin H. Schilling, Muscatine, IA (US); Dan Freeman, Muscatine, IA (US); Roger E. McPherson, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 720 days.

(21) Appl. No.: 11/077,061

(22) Filed: Mar. 10, 2005

(65) Prior Publication Data

US 2005/0194566 A1    Sep. 8, 2005

Related U.S. Application Data

(62) Division of application No. 10/611,485, filed on Jul. 1, 2003, now Pat. No. 7,070,709.

(60) Provisional application No. 60/451,728, filed on Mar. 4, 2003, provisional application No. 60/393,170, filed on Jul. 2, 2002.

(51) Int. Cl.
    *C09K 3/22* (2006.01)
(52) U.S. Cl. ...................... 252/88.1; 252/88.2
(58) Field of Classification Search ................. 252/88.1, 252/88.2
    See application file for complete search history.

(56) References Cited

U.S. PATENT DOCUMENTS

| 865,578 A | 9/1907 | Ellis |
|---|---|---|
| 1,075,856 A | 10/1913 | Robeson |
| 2,375,019 A | 5/1945 | Miller |
| 2,801,955 A | 8/1957 | Rutenberg et al. |
| 2,868,778 A | 1/1959 | Watson et al. |
| 3,053,019 A | 9/1962 | Mozdy |
| 3,174,942 A | 3/1965 | Erikson et al. |
| 3,622,463 A | 11/1971 | Iizuka |
| 3,716,526 A | 2/1973 | Schweiger |
| 4,001,033 A | 1/1977 | Anthone et al. |
| 4,038,481 A | 7/1977 | Antrim et al. |
| 4,276,077 A | 6/1981 | Zaslavsky et al. |
| 4,387,205 A | 6/1983 | Zaslavsky et al. |
| 4,437,896 A | 3/1984 | Partanen |
| 4,592,931 A | 6/1986 | Cargie |
| 4,822,425 A | 4/1989 | Burch |
| 4,885,387 A | 12/1989 | Krochta |
| 5,023,103 A | 6/1991 | Ramaswamy |
| 5,194,174 A | 3/1993 | Roe et al. |
| 5,412,007 A | 5/1995 | Hendrix et al. |
| 5,860,770 A | 1/1999 | Hunt |
| 6,063,178 A | 5/2000 | McPherson et al. |
| 6,065,903 A | 5/2000 | Doyle |
| 6,132,638 A | 10/2000 | Oldenhove |
| 6,162,575 A * | 12/2000 | Fujioka et al. ............... 430/204 |

FOREIGN PATENT DOCUMENTS

WO    WO 98/40413    9/1998

* cited by examiner

*Primary Examiner*—Gregory R Del Cotto
(74) *Attorney, Agent, or Firm*—Banner & Witcoff Ltd.

(57) ABSTRACT

Disclosed are dust suppressant and aggregate stabilization compositions. In accordance with the subject disclosure, hemicellulose is used as a dust suppressant and/or as a stabilization composition for aggregates such as a road bed or soil field. Other ingredients may be used in a composition in conjunction with hemicellulose. For instance, a lignin compound may be used to enhance dust suppression and/or aggregate stabilization. A surfactant may be used to decrease the viscosity of the composition. A crosslinking agent may be used to enhance the water resistance of the composition. A chloride salt may be added to increase the hygroscopicity of the composition.

10 Claims, No Drawings

DUST SUPPRESSANT AND SOIL STABILIZATION COMPOSITION

CROSS-REFERENCE TO RELATED PATENT APPLICATIONS

This patent application is a divisional of Ser. No. 10/611/485, filed Jul. 1, 2003, now U.S. Pat. No. 7,070,709, which claims priority to prior U.S. Provisional Patent Application No. 60/451,728, filed Mar. 4, 2003, and to prior U.S. Provisional Patent Application No. 60/393,170, filed Jul. 2, 2002.

FIELD OF THE INVENTION

This invention is in the field of dust suppressant and aggregate stabilization compositions, such as stabilization compositions for road and soil volumes.

BACKGROUND OF THE INVENTION

The need for treatment of unpaved roads and other outdoor surfaces to reduce airborne dust is well recognized. In addition to reduced driver visibility and adverse health and aesthetic consequences, airborne dust indicates deterioration and actual loss of road surface. This represents a significant cost in the form of loss of aggregate and increased maintenance time. Much of the need for dust control is on rural, unpaved aggregate roads, but dust control is important in many other areas, such as construction sites, mines, farms, golf courses, parking lots and so forth.

The prior art has provided numerous dust control agents to address these problems. The simplest way to reduce the release of airborne dust is to apply water. Water alone is a poor dust control agent, because its high surface tension decreases its efficiency in coating fine particles, and its rapid evaporation provides a very short useful life. Salt brines also may be used. Certain salts are hygroscopic and can absorb moisture from the air, thereby keeping enough water content at the surface to maintain some level of effectiveness. However, the free solubility and low viscosity of the resultant solutions allows the salt to be readily carried off the surface during rainfall.

Other dust control agents have been provided in the art. These agents prevent particulate material from becoming airborne and conventionally function by providing a liquid film that coats and holds particles together. Individual particles become part of an agglomerated collection, which is less likely to take flight due to the increased mass of the collection relative to the individual particles.

Dust control is in most cases a superficial and temporary remediation. Road and/or soil stabilization are more aggressive techniques that involve forming a longer-lasting structure, which incorporates subsurface matter to some depth in combination with an externally applied binder. The binders used for dust control and for road or soil stabilization serve a similar function, with the binding ability or amount of the binder varying across a spectrum.

The art has provided numerous binders that are useful in connection with dust suppression and aggregate (road or soil) stabilization. Known binders for aqueous compositions may be divided roughly into three classes, including lignin sulfonate compounds; chloride salts, specifically calcium chloride or magnesium chloride; and synthetic binders.

For instance, U.S. Pat. No. 6,132,638 to Oldenhove purports to disclose a dust control composition that comprises an anionic surfactant and a dust control agent such as polyvinyl pyrrolidone, a perfluoroalkyl polymer, polysiloxane, and the like.

U.S. Pat. No. 5,860,770 to Hunt purports to disclose a composition for control of soil erosion and dust, the composition containing monomeric resins, enzymes, surfactants and water.

U.S. Pat. Nos. 5,194,174, 3,174,942, and 4,592,931 purport to disclose the use of various synthetic polymers for treating soil.

U.S. Pat. No. 4,001,033 to Anthone, et al. purports to disclose a composition for soil stabilization that includes lignosulfonate with added dispersants such as fatty acid esters and polyoxyethylene ethers. The dispersants are said to improve the distribution of lignin sulfonate. U.S. Pat. Nos. 4,276,077 and 4,387,205 describe a graft modified lignin compound for soil stabilization.

U.S. Pat. Nos. 865,578, 1,075,856, 2,375,019, and 3,053,019 all describe various sulfite waste liquors for soil stabilization.

U.S. Pat. No. 6,065,903 to Doyle purports to disclose the use of tall oil emulsions for soil stabilization to enhance the load bearing characteristics of the soil. An emulsifier is added to allow the insoluble tall oil to form an emulsion in water. U.S. Pat. Nos. 4,437,896 and 4,822,425 purport to describe other tall oil compositions for soil stabilization. Numerous other patents disclose oil based compositions for dust control and/or soil stabilization including U.S. Pat. No. 5,412,007 to Hendrix et al. which is said to disclose a lignosulfonate compound in anionic form as a surfactant for petroleum resins.

Of the current products that provide effective dust suppression, certain drawbacks exist, namely poor longevity, environmental toxicity and cost. Many such products that have a desirable useful life are generally considered to be environmentally unsafe. Other products that are more environmentally friendly have a shorter useful life. Synthetic binders that possess a favorable useful life and that do not have serious environmental problems are available, but such products are costly. Oils and oil emulsions are costly, have stickiness concerns and are not environmentally friendly.

For example, the prior art teaches that lignin compounds are effective for dust control, but only when combined with chloride salts. Due to environmental concerns, there is increasing sensitivity to the use of chloride containing compounds. With respect to chloride compounds, a typical dust control application with a chloride product releases many times more chloride into the environment than does a salt roadway deicing operation. Moreover, known materials derive their effectiveness from the hygroscopicity of one of the components. Although generally effective in drawing enough moisture from the air to immobilize dust particles, the highly soluble nature of the agents causes them to be easily washed away.

It is an object of this invention to provide a dust suppressant composition that is highly effective in reducing the generation of airborne particulate matter and that remains effective for a long period of time. In other embodiments, it is an object to provide a soil stabilization composition.

BRIEF SUMMARY OF THE INVENTION

The invention provides a composition for dust suppressant and/or aggregate stabilization, the composition in one embodiment comprising hemicellulose and a surfactant, and in another embodiment comprising hemicellulose and a crosslinking agent (and optionally a surfactant). The composition may include a lignin compound. Also encompassed by the invention are a method for dust suppressant and a method for aggregate stabilization. The method for reducing the release of airborne dust from a surface containing dust fines comprises applying to the surface an amount of a dust control agent that is effective to bind at least a portion of the dust fines. The dust control agent includes a hemicellulose, generally in aqueous solution. Optionally, but preferably, the composition further includes a surfactant and/or a crosslinking agent, and/or a lignin compound. The method for stabilizing a volume of aggregate comprises applying to the volume an amount of a stabilizing agent that is effective to stabilize the volume, the stabilizing agent comprising hemicellulose, generally in an aqueous solution. Again, optionally but preferably the hemicellulose is provided in aqueous solution with a surfactant and/or a crosslinking agent, and/or a lignin compound. The volume of aggregate may be, for instance, a soil field or a road bed.

Generally, hemicellulose is the noncellulosic polysaccharide component of plant cell walls. In one preferred embodiment of the invention, the hemicellulose is a soluble fraction extracted from wood. During the manufacture of composite wood products such as particleboard, plywood, fiberboard, and the like, the soluble hemicellulose fraction is extracted. Often, in contrast to sulfite pulping processes, the lignin component in the wood is not solubilized, and thus the hemicellulose does not contain lignin. The hemicellulose extract comprises an aqueous solution of many of the soluble components of wood. The solution is composed of water, minor amounts of salts and inorganic acids, 5-10% by weight of lower molecular weight organic acids salts, 10-20% free sugars, and the remainder the hemicellulose polysaccharide, which is composed primarily of arabinose, galactose, glucose, xylose, and mannose in various proportions. Such aqueous composition may be and preferably is used as the dust suppressant and/or soil stabilization agent. Optionally, the hemicellulose may be purified.

Alternatively, the hemicellulose may be derived from grains or other plant products, in particular corn, wheat, and the like. Preferably, corn hull hemicellulose is used. Again, the corn hull hemicellulose may be purified, or may be used in a less pure form. It is contemplated that a composition containing a lesser proportion of hemicellulose can perform adequately, particularly if a compensating quantity of the overall composition is used.

Procedures have been described for the isolation of corn hull hemicelluloses. For example, U.S. Pat. No. 2,801,955 ("the '955 patent) discloses a method of extracting hemicellulose from corn bran by treating corn bran with calcium hydroxide at temperatures achievable at atmospheric pressure and then separating the resulting hemicellulose extract from the residual insolubles. Also taught in the '955 patent is the benefit of treatment with activated carbon to achieve lower color, and the precipitation of hemicellulose from water by the addition of the co-solvent, ethanol. The '955 patent further discloses the removal of starch from the starting bran by use of a separate step that entails cooking the bran to paste the starch, adjusting the pH and temperature, adding enzyme to digest the starch, and filtering and washing the destarched bran. Moreover, U.S. Pat. No. 2,868,778 discloses the advantages of using lime to extract hemicellulose from corn coarse fiber, as well as the removal of the calcium cation by precipitation with $CO_2$, $SO_2$, phosphoric acid, sulfuc acid, and oxalic acid. U.S. Pat. No. 3,716,526 discloses a process for removing impurities from crude hemicellulose gum which comprises suspending crude solid hemicellulose gum in an aqueous organic acid containing liquid which may or may not contain water-miscible cosolvents consisting of lower alkanols and ketones, and which solubilizes impurities but does not solubilize the hemicellulose gum. U.S. Pat. No. 4,038,481 discloses a method for treating destarched corn hulls in a solvent system consisting of water and a water miscible organic co-solvent with a sufficient amount of alkali to hydrolyze the corn hulls to effect liberation of the hemicellulose fraction so that it may be solubilized in water and to solubilize the noncarbohydrate fraction. WO 98/40413 describes an aqueous process that entails destarching and washing the corn hulls in an initial separate step, reacting with alkaline hydrogen peroxide at temperatures achievable under atmospheric conditions in order to extract the hemicellulose, separating out insolubles, and utilizing ultrafiltration to remove soluble impurities from the hemicellulose. U.S. Pat. No. 5,023,103 describes the alkaline treatment of an aqueous slurry of oat hulls under elevated temperatures and pressures which solubilizes hemicellulose. Moreover, U.S. Pat. No. 5,622,7038 teaches the alkaline extraction of hemicellulose followed by partial hydrolysis of the hemicellulose with the enzyme xylanase.

Applicants have classified several preferred classes of hemicelluloses, each of which may be classified according to the process by which it is prepared. These classes of hemicellulose are characterized by different processing conditions resulting in different degrees of purity. All are deemed useful in connection with the invention, and the selection of a particular hemicellulose will be determined by the degree of purity desired. Generally the purer forms of hemicellulose are more costly. One class of hemicellulose is obtained in accordance with process described in U.S. Pat. No. 4,038,481 (Antrim et al.). This type of hemicellulose is highly purified (greater than 90% hemicellulose) and is generally obtained via solvent extraction. Highly purified hemicellulose also may be obtained by alkaline hydrolysis of corn hulls, followed by purification by ultrafiltration. An example of this second category of hemicellulose is described in U.S. patent application Ser. No. 09/726,092.

A second class of hemicellulose is the hemicellulose obtained from alkaline-cooked destarched hulls. The hemicellulose may be prepared by destarching corn hulls, cooking the destarched hulls under alkaline conditions, and removing the insoluble materials therefrom. This type of hemicellulose contains roughly 60-70% hemicellulose. An exemplary hemicellulose of this type is described in U.S. Pat. No. 6,063,178.

A third class of hemicellulose is the hemicellulose obtained from akaline-cooked corn hulls without separating the insolubles or other materials. This material typically contains less than 50% hemicellulose. This type of hemicellulose can be broken down into categories according to the process by which it is prepared. One such hemicellulose is prepared by extrusion of alkali-treated corn hulls, examples of which can be found in U.S. patent application Ser. No. 09/901,342 (Example 3) and Ser. No. 09/864,779 (Example 3), which describe the preparation of a hemicellulose composition via alkaline extrusion-cooking of corn hulls obtained from a corn wet milling process. Another such hemicellulose is prepared by jet cooking alkali-treated corn hulls, examples of which can be found in U.S. patent application Ser. No. 09/901,342 (Example 1), Ser. No. 09/864,779 (Example 1), and U.S. Provisional Patent Application No. 60/216,083 (Example 1A), which describe the preparation of a hemicellulose composition via jet-cooking corn hulls under alkaline conditions using high pressure steam. Yet another such hemicellulose is prepared by batch cooking alkaline treated corn hulls, an example of which can be found in U.S. patent application Ser. No. 09/901,342 (Example 2), Ser. No. 09/864,779 (Example 2), and 60/216,083 (Example 1B), which describe the preparation of a hemicellulose composition via batch cooking under alkaline conditions at atmospheric pressure.

A fourth class of hemicellulose is referred to as "holocellulose." Holocellulose is a highly refined mixture of hemicellulose and cellulose with few impurities. Holocellulose contains roughly 70% hemicellulose. Examples of holocellulose can be found in U.S. patent application Ser. No. 09/901,342 (Example 5).

A fifth class of hemicellulose is prepared by cooking hulls that have not been destarched under alkaline conditions, followed by the removal of insoluble materials from the alkali-cooked hulls, which produces a hemicellulose-containing product that imparts superior water-retention properties and does not significantly increase the viscosity of the inventive composition. This method of hemicellulose preparation is described in, for example, U.S. Provisional Patent Application No. 60/316,467.

Solutions of corn hull hemicellulose can have a high viscosity, which may limit the dispersion compared to lignosulfonate at similar concentrations. Accordingly, a surfactant may be added in amount effective to lower the viscosity of the hemicellulose solution. Preferred surfactants include sodium dodecylbenzene sulfonate, ethoxylated alcohol and sodium lauryl sulfate, with the most preferred surfactant being sodium lauryl sulfate. The surfactant, when used, may be used in any amount effective to lower solution viscosity.

The solution may further include a lignin compound. Lignin compounds useful in connection with the invention include lignin and lignin derivatives, such as those used in connection with prior art dust suppressant applications. Lignin is a group of chemical compounds that is found in the cell walls of plants. Typically, lignin has a polymeric, crosslinked structure. Lignin derivatives include by-products of the commercial delignification of cellulose materials, such as with sulfites. For instance, lignosulfonates (such as ammonium lignosulfonate) have dust suppression properties, and may be used in connection with the invention. The lignin compound may be present in an amount effective to enhance the dust suppression ability of the composition and/or aggregate stabilizing ability.

The hemicellulose and surfactant may be present in the composition in any suitable overall amount and amounts with respect to one another. Preferably, the hemicellulose is present in the composition in a total amount ranging from 0.1 to 90%, more preferably, from 10 to 50%. When used, the surfactant preferably is used in an amount of 0.1 to 10%. When lignin is used, preferably lignin and hemicellulose are present in an amount ranging from 0.1 to 90%, preferably 10 to 50%. Lignin and hemicellulose may be present in any amount relative to one another. When used, lignin is preferably present in an amount from 1 to 50% by weight of hemicellulose. The surfactant and crosslinking agent preferably are present, if at all, in an amount up to about 5%. These and other percentage ranges expressed herein are expressed on a dry solids basis.

Crosslinking agents, such as borax or acetone/formaldehyde, may be used in conjunction with the invention. It is believed that such crosslinking agents may improve the water resistance of the compositions by increasing the molecular weight of the composition thus decreasing their solubility. One acetone/formaldehyde crosslinking agent is sold under the trademark AQUATITE. If used, the crosslinking agent should be present in an amount effective to improve the water resistance of the composition.

Preferably, other ingredients, such as chloride salts, are not present. Hemicellulose contains a very minor amount of chloride, on the order of tenths of a percent. The characteristic makes the composition well suited where environmental concerns limit the application of chloride. However, if desired, the hemicellulose may be used in conjunction with chloride salts, or indeed with any other binder known or hereinafter found to suitable for use in conjunction with the invention.

The following examples are provided to illustrate the invention, but should not be construed as limiting the invention in scope.

EXAMPLES

Binders were prepared and evaluated. To evaluate each binder for soil stabilization, a procedure was developed to test for binding ability using a sample of rural road gravel. The material, primarily limestone aggregate, was screened and the fraction that passed through a 14 mesh screen but was retained on a 40 mesh screen was used. Measured quantities of this material (20 grams) were mixed with aqueous solutions of the binder (typically 2 grams) to form a slurry. A measured amount of this slurry was then compacted to form a cylindrical plug. The apparatus used to form and compress the plugs was a 50 mL syringe with the end removed. To form the plugs, the slurry was added to the barrel of the syringe. The syringe was placed onto a hard surface, then the plunger was depressed to compress the material to form a solidified plug. The plugs were one inch in diameter and approximately one half inch thick. After curing the plugs for 24 hours, the plugs were tested for compressive strength using an INSTRON tensile tester. The force required to fracture each plug was recorded.

Each binder formulation was tested in duplicate. In some cases, a third plug was produced and tested for water resistance. To measure water resistance, the plugs were placed in a tray through which water flowed at a constant rate (typically one liter/minute). The time required for each plug to reach a predetermined extent of disintegration was recorded. The time to disintegration was measured as the amount of time required for approximately ⅓ of cylinder plug to collapse, as measured by visual observation.

Example 1

Binders 1A-1G were prepared and evaluated according to the procedure outlined above. The binders that did not include hemicellulose were provided as control examples.

TABLE 1

| Binder | Stress at Failure, psi | Time to Disintegrate |
|---|---|---|
| 1A | 290 | 25 min |
| 1B | 210 | |
| 1C | 262 | 25 min |
| 1D | 247 | |
| 1E | 278 | 5 min |
| 1F | 216 | |
| 1G | 80 | |

1A 2 g of 25% corn hemicellulose (sodium digest)
1B 2 g of A blended 1:1 with 32% magnesium chloride
1C 2 g of 25% corn hemicellulose (calcium digest)
1D 2 g of C blended 1:1 with 32% magnesium chloride
1E 2 g of sodium lignosulfonate
1F 2 of E blended 1:1 with 32% magnesium chloride
1G 2 g of 32% magnesium chloride This data show that the corn hemicellulose (CHG) provides binding performance that is equivalent to the lignosulfonate compositions while imparting an improved water resistance.

Example 2

Solutions of binder 2A-2H were evaluated in the same manner (again, examples without hemicellulose were evaluated as controls).

TABLE 2

| Binder | Stress at Failure, psi |
|---|---|
| 2A | 292 |
| 2B | 380 |
| 2C | 340 |
| 2D | 127 |
| 2E | 103 |
| 2F | 95 |
| 2G | 103 |
| 2H | 63 |

2A 2 g of 10% sodium lignosulfonate
2B 2 g of 25% sodium lignosulfonate
2C 2 g of 10% corn hemicellulose
2D 1 g of 10% sodium lignosulfonate
2E 1 g of 25% sodium lignosulfonate
2F 1 g of 10% corn hemicellulose
2G 0.3 g of 50% sodium lignosulfonate
2H 0.3 g of a 75/25 blend of 50% sodium lignosulfonate/32% magnesium chloride This data indicates that reduced concentrations of corn hemicellulose may be used with good results. Solutions of lignosulfonate at 25% exhibited better performance than corn hemicellulose at 10%, but the numerical results were not proportionally increased.

Example 3

After investigating the properties of several surfactants, sodium dodecyl benzene sulfonate, ethoxylated alcohol and sodium lauryl sulfate were found to improve the ease in which the corn hemicellulose solutions become dispersed in the aggregate matrix. The sodium lauryl sulfate was particularly effective, reducing the viscosity of a 10% corn hemicellulose solution from 400 to 300 centipoise when added at 4% by weight on a liquid basis. Testing data is shown below.

TABLE 3

| Binder | Stress at Failure, psi |
|---|---|
| 3A | 190 |
| 3B | 355 |
| 3C | 245 |

3A 2 g of 10% corn hemicellulose
3B 2 g of 3A with 0.15 g sodium lauryl sulfate
3C 2 g of 3A with 0.15 g ammonium lauryl sulfate These results indicate the surfactants can improve the binding performance of corn hemicellulose, presumably by facilitating good dispersion during mixing.

Example 4

Experiments were performed to investigate the effect of chemical crosslinking agents on the strength and/or water resistance of the soil stabilization plug.

TABLE 4

| Binder | Stress at Failure, psi | Time to Disintegrate |
|---|---|---|
| 4A | 427 | 10 min |
| 4B | 411 | 50 min |
| 4C | 403 | 10 min |

4A 2 g of 10% corn hemicellulose
4B 4A with 0.07 g acetone/formaldehyde crosslinking agent
4C 4A with 0.03 g borax crosslinking agent The acetone/formaldehyde agent used was AQUATITE, a commercially available product used for waterproofing corrugating adhesives. Borax is commonly used as a crosslinking agent for polysaccharides.

The data shows that, although neither crosslinking agent caused an improvement in strength, the acetone/formaldehyde led to a substantial improvement in water resistance.

Example 5

Wood hemicellulose (approximately 40% solids) was evaluated qualitatively for use as a dust control agent. Three experiments were performed using the wood hemicellulose solution, the solution combined with 30% calcium chloride solution, and the solution was combined with 30% magnesium chloride solution. For controls, solutions of ammonium lignosulfonate, ammonium lignosulfonate with 30% calcium chloride, and ammonium lignosulfonate with 30% magnesium chloride were further evaluated.

The foregoing solutions were applied onto glass plates and observed over time. After about three weeks, the lignosulfonate solution had dried to powder. The lignosulfonate/magnesium chloride blend remained more intact, and had retained some moisture. The lignosulfonate/calcium chloride blend had dried somewhat, but had retained a more intact film.

On the other hand, the solutions of wood hemicellulose without salts remained as intact as lignosulfonate blends with salt. The solutions of hemicellulose with salt retained even more moisture, even to the extent of maintaining a syrup consistency.

These experiments were repeated, except that the solutions were blended 1:1 with 200 mesh road dust. The same results were observed.

Water was flowed over the foregoing films. It was qualitatively observed that the wood hemicellulose compositions were equivalent and in some instant superior to similar lignosulfonate compositions, in that it took up to three times longer to wash the dried hemicellulose solution from the glass plates.

Example 6

This example demonstrates a method for producing hemicellulose comprising treating corn hulls with sodium hydroxide and extrusion cooking.

A Wenger TX 57 Twin Screw Extruder was used for extrusion cooking corn hulls in the presence of sodium hydroxide. Sodium hydroxide was added at a rate of 10% on corn hulls. The maximum extruder jacket temperature was controlled to around 325° F., and the product was dried in a Proctor and Schwartz moving grate drier at around 240° F. The extruder operating conditions are provided in Table 5.

TABLE 5

Co-Extrusion Of Alkali And Corn Hulls

| CYLINDER INFORMATION | |
| --- | --- |
| Dry Recipe Rate lb./hr. | 145 |
| Feed Screw Speed rpm | 13-14 |
| Cylinder Speed rpm | 282 |
| Steam Flow to Cylinder lb./hr. | 0 |
| Water Flow to Cylinder lb./hr. | 0 |
| EXTRUSION INFORMATION | |
| Extruder Shaft Speed rpm | 76 |
| Steam Flow to Extruder lb./hr. | 4 |
| Water Flow to Extruder lb./hr. | 15 |
| Extruder Additive Rate &Temp 50% NaOH @25° C. | 216 mL/min |
| Knife Speed rpm | 392 |
| No. of Knives | 2 |
| 1" Head Temp. | 116° F. |
| 2" Head Temp. | 239° F. |
| 3" Head Temp. | 327° F. |
| 4" Head Temp. | 329° F. |
| 5" Head Temp. | 326° F. |
| Die Hole Size &How Many | 3 mm; 36 holes |
| Die Pressure psi | 100 |

Example 7

This example demonstrates a method of producing hemicellulose comprising treating corn hulls with sodium hydroxide and jet-cooking Dried corn hulls from a corn wet milling process of US Number 2 grade hybrid yellow corn were ground to a fine flour and assayed to contain 6.2% moisture, 7.88% dry basis protein, 11.2% dry basis starch, and 4.65% dry basis fat. The ground corn hulls, 833 g dry basis, were slurried into 9,000 g tap water. NaOH (64.0 g) was added and the pH was measured to be 11.95.

The resulting slurry was continuously jet-cooked in a continuous jet-cooker equipped with a Hydroheater Combining Tube which inflicted high shear into the slurry at the point of contact with the high pressure steam at ~150 psig. The jet-cooking conditions were as follows: temperature=315° F. to 325° F., pressure=~70 psig, time=12.6 minutes.

It is anticipated that the product of Example 7 would exhibit performance characteristics similar to those of the product of Example 6 when used as an ingredient of dust abatement formulations.

Example 8

This example demonstrates dust suppression by the product described in Example 6.

The efficacy of the dust control material made in Example 6 was demonstrated by treating two different heavily utilized parking lots of equal size, 960 ft.×100 ft. or 10,666.0 yd$^2$, and of the equal composition of crushed lime stone aggregate.

Lot #1 served as the control, and it was treated with 3,519.7 total gallons of the following dust abatement formulation: 1 part by volume MgCl$_2$ at 15% solids, and 3 parts by volume ammonium lignosulfonate at 25% solids (sp. gr. 1.132). The dust abatement formulation was sprayed onto Lot #1 at an application rate of 0.33 gallons per yd$^2$. At a dry solids of 1.9 lbs./gal., 6,687.4 lbs. dry solids were applied to 10,666.0 yd$^2$.

Lot #2 was treated with 3,519.7 total gallons of the following dust abatement formulation: 3,519.7 gallons of a formulation containing 1 part by volume MgCl$_2$ at 15% solids, 3 parts by volume ammonium lignosulfonate at 25% solids (sp.gr.1.132), and 600 lbs of the product described in Example 6. The dust abatement formulation was sprayed onto Lot #2 at an application rate of 0.33 gallons per yd$^2$. At a dry solids of 2.05 lbs./gal., 7,215.3 lbs. dry solids were applied to 10,666.0 yd$^2$.

The two lots were heavily utilized by semi trailer trucks. Based on the observations of one of the inventors, the two lots were judged for dustiness on a daily basis on a visual scale of 0 to 50 for twenty-one days (0 is no dust and 50 is very dusty).

The data set forth below in Table 6 show the superior dust control test results of the dust control formulation made with the product described in Example 6 over those of the dust control formulation made without the product described in Example 6. Rain fall totaling 0.52 inches fell onto the lots on days 15, 16, 17, and 18 of the test. On day 18 of the test, dust generation was observed at Lot #1, while no dust was observed at Lot #2. On days 19, 20, and 21, the dust became greater each day at Lot #1 while no dust was observed at Lot #2.

TABLE 6

| Day | Max Temp. ° F. | Min Temp. ° F. | Rh 3:00 pm | Precip. Inches | Dust Level 0-50 Lot #1 | Dust Level 0-50 Lot #2 |
| --- | --- | --- | --- | --- | --- | --- |
| 0 | 82 | 58 | 33 | 0.32 | 0 | 0 |
| 1 | 83 | 53 | 33 | 0.00 | 0 | 0 |
| 2 | 83 | 55 | 42 | 0.00 | 0 | 0 |
| 3 | 87 | 56 | 44 | 0.00 | 0 | 0 |
| 4 | 91 | 63 | 35 | 0.00 | 0 | 0 |
| 5 | 91 | 64 | 45 | 0.00 | 0 | 0 |
| 6 | 91 | 64 | 40 | 0.00 | 0 | 0 |
| 7 | 84 | 62 | 60 | 0.00 | 0 | 0 |
| 8 | 77 | 54 | 32 | 0.00 | 0 | 0 |
| 9 | 77 | 50 | 34 | 0.00 | 0 | 0 |
| 10 | 80 | 50 | 35 | 0.00 | 0 | 0 |
| 11 | 79 | 59 | 66 | 0.00 | 0 | 0 |
| 12 | 73 | 60 | 46 | 0.03 | 0 | 0 |
| 13 | 81 | 48 | 37 | 0.00 | 0 | 0 |
| 14 | 80 | 51 | 48 | 0.00 | 0 | 0 |
| 15 | 82 | 64 | 62 | 0.01 | 0 | 0 |
| 16 | 82 | 70 | 50 | 0.12 | 0 | 0 |
| 17 | 71 | 56 | 75 | 0.33 | 0 | 0 |
| 18 | 75 | 51 | 55 | 0.06 | 10 | 0 |
| 19 | 67 | 44 | 28 | 0.00 | 20 | 0 |
| 20 | 74 | 40 | 30 | 0.00 | 30 | 0 |
| 21 | 67 | 38 | 32 | 0.00 | 40 | 0 |

Thus, it is seen that hemicellulose, in particular wood and corn hull hemicellulose, has dust control performance that is equivalent or better to lignosulfonate compositions. Wood hemicellulose is potentially useful without chloride, thus providing an environmentally friendly dust control agent. It is further contemplated that such hemicellulose may be used in connection with aggregate stabilization, such as soil or road stabilizations. Hemicellulose has superior water resistance as compared to conventional dust control compositions.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention unless otherwise claimed. No language in the specification should be construed as indicating any non-claimed element as essential to the practice of the invention. This invention includes all modifications and equivalents of the subject matter recited in the claims appended hereto as permitted by applicable law.

Moreover, any combination of the above-described elements in all possible variations thereof is encompassed by the invention unless otherwise indicated herein or otherwise clearly contradicted by context.

What is claimed is:

1. A method for reducing the release of airborne dust from an outdoor surface containing dust fines, comprising applying to said surface an amount of a dust control agent composition effective to bind at least a portion of said dust fines, said dust control agent composition comprising a corn hull hemicellulose, a lignin compound, and a chloride salt, said salt being present in an amount effective to enhance the hygroscopicity of said composition.

2. A method according to claim 1, said dust control agent composition further comprising a lignin compound.

3. A method according to claim 1, said dust control agent composition being present as in aqueous solution, said solution further comprising a surfactant, said surfactant being present in an amount effective to reduce the viscosity of said solution.

4. A method according to claim 1, said dust control agent composition further comprising a crosslinking agent, said crosslinking agent being present in an amount effective to enhance the water resistance of said composition.

5. A method according to claim 1, said surface comprising a road surface.

6. A method according to claim 2, said surface comprising a road surface.

7. A method for reducing the release of airborne dust from an outdoor surface that contains dust fines, comprising applying to said surface an amount of a dust control agent composition effective to bind at least a portion of said dust fines, said dust control agent composition being an aqueous solution comprising corn hull hemicellulose and a surfactant, said surfactant being present in an amount effective to reduce the viscosity of said solution.

8. A method according to claim 7, said dust control agent composition further comprising a lignin compound.

9. A method according to claim 7, said dust control agent composition further comprising a crosslinking agent, said crossliniking agent being present in an amount effective to enhance the water resistance of said composition.

10. A method according to claim 7, said surface comprising a road surface.

* * * * *